Oct. 30, 1962 W. J. CRUMP 3,060,772
COUNTERSINK TOOL AND CONTROL MEANS
Filed March 7, 1960 3 Sheets-Sheet 3
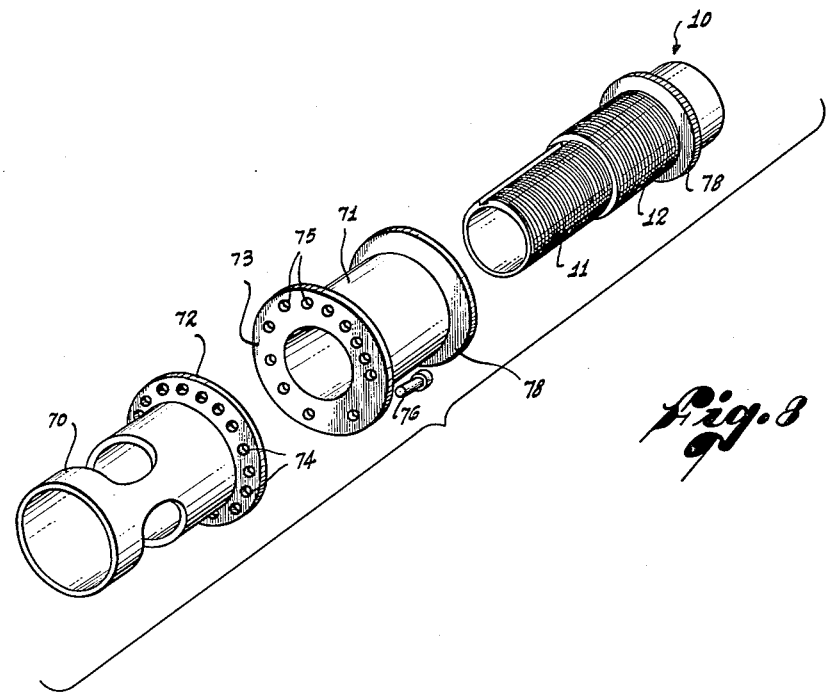
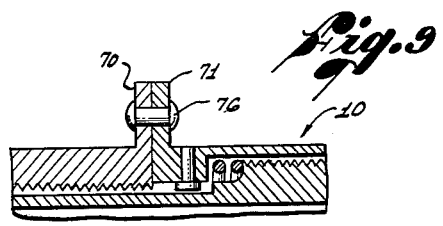
INVENTOR.
WOODFORD J. CRUMP
BY Lulvidu Mattingly & Huntley
Attorneys

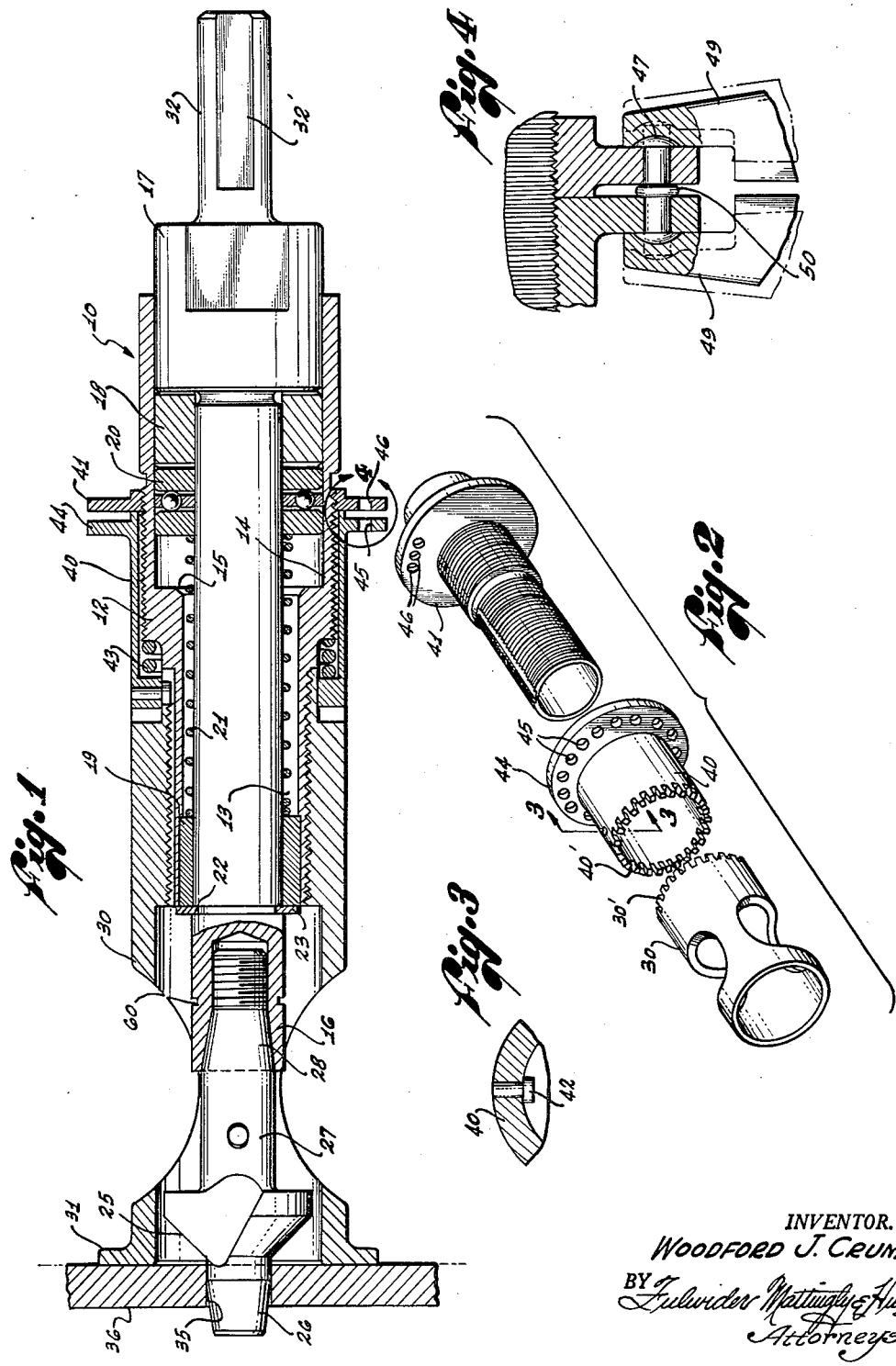

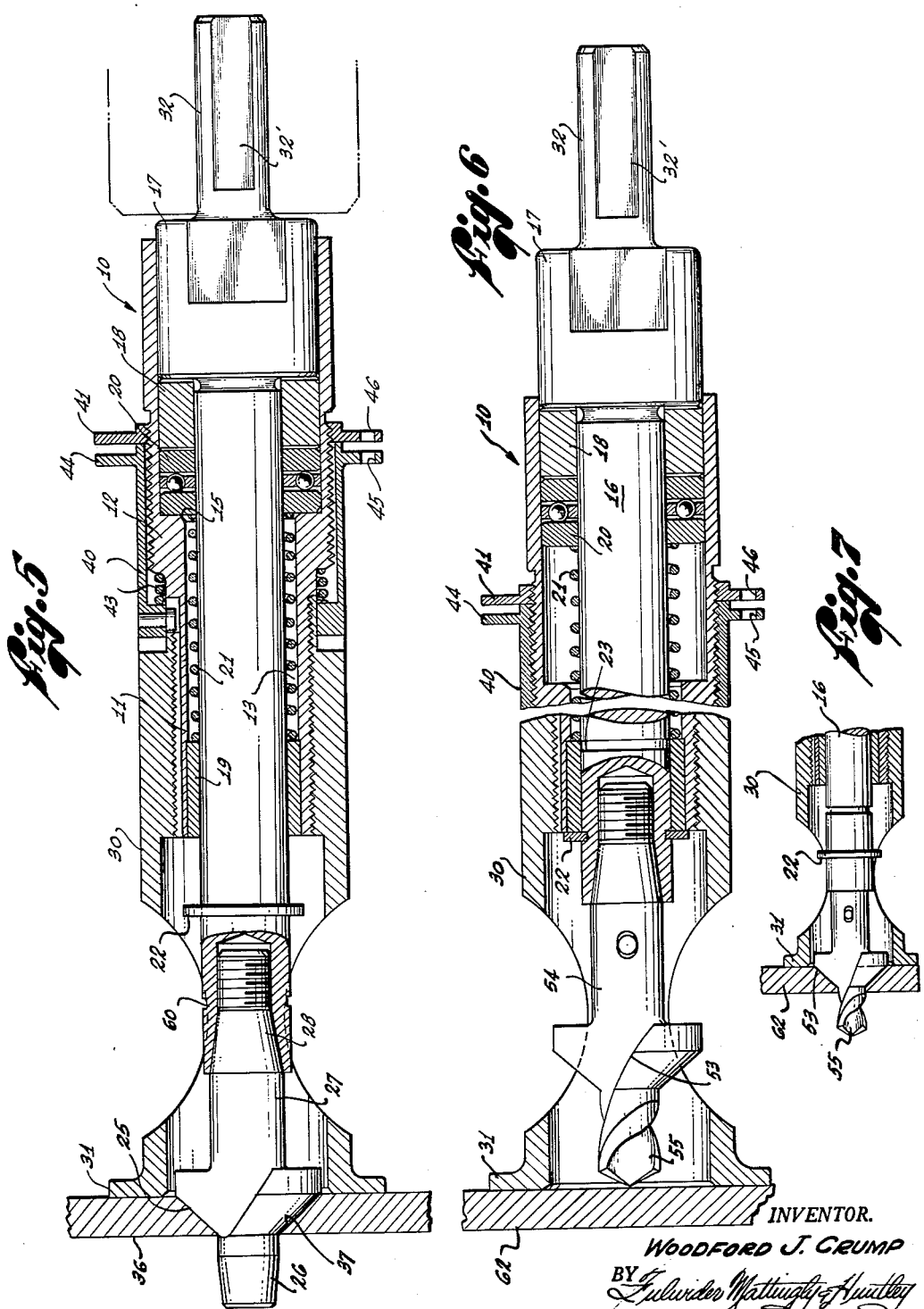

United States Patent Office 3,060,772
Patented Oct. 30, 1962

3,060,772
COUNTERSINK TOOL AND CONTROL MEANS
Woodford J. Crump, South Gate, Calif., assignor to Aircraft Tools, Inc., Los Angeles, Calif., a corporation of California
Filed Mar. 7, 1960, Ser. No. 13,102
7 Claims. (Cl. 77—73.5)

This invention relates to cutting tools, and more particularly to apparatus for removing material from the surface of an article to provide surface openings of predetermined shape.

More specifically, this invention relates to devices for controlling the shape and depth of cuts formed in the surface of an article. Precisely controlled cutting is essential in the production of many products. In the production of aircraft, for example, structural plates have to be secured in place with rivets and screws. As is well known, literally thousands of rivets and screws are used for this purpose.

In fastening aircraft panels in place, particularly the structural panels that form the outer "skin" of an aircraft, fasteners are flush-mounted. For this purpose, a plurality of openings to receive the shanks of these fasteners are drilled through the panel where the fasteners are to be located. Thereafter, each opening is countersunk to the proper depth to receive the conical portion of the head of a fastening element.

As will be apparent, if the countersink is not at the proper depth to permit the head of the fastening element to be flush with the surface of the panel, the finished panel will have interruptions along its surface. Where the countersink is not deep enough, a surface interruption is formed by the head of a fastening element extending above the surface. Where the countersink is too deep, the flat head of the fastening element is below the surface, so that the surface interruption is an abrupt depression.

As it will be apparent, where a finished panel is in a highly critical location, as where it forms the outer skin of a supersonic aircraft, it has to be rejected if there are any abrupt interruptions on its surface. The reason, of course, is that the interruptions constitute areas of friction which at extremely high speeds can result in the panel being heated and weakened to such an extent that it fails. Therefore, it will be seen that it is essential that all countersinks be formed to a precise depth in the surfaces of the panels.

Devices have heretofore been used to cut countersinks, counterbores and the like to a controlled depth. However, a disadvantage of such devices, and the cutting tools used therewith, is that the cuts made therewith are often not concentric with the axis of the hole. Typically, prior art devices employ a rotatable shaft to which the shank of a cutting tool is threadedly secured. A non-rotatable cylindrical stop element surrounds the shaft and the tool, and is adapted to be placed against the surface of the panel in which the cut is to be made. The shaft is adapted to move axially a limited amount, so that the end of the cutting tool can be moved past the end of the stop element, i.e., the position of the stop element determines the depth of the cut. However, due to the shank of the cutting tool being supported solely by its threaded connection with the shaft, the shank undergoes translational movement when a force is applied to the opposite end of the shaft while it is rotating. If the tool forms a countersink, such motion results in the countersink being non-concentric with the axis of the countersunk hole.

Another disadvantage of devices heretofore known for forming countersinks, counterbores, and the like, is that they do not provide an operator with the assurance that successive cuts made therewith are the same depth. For example, a worker upon visually inspecting a countersink may conclude that it is not deep enough. He then readjusts the parts so that the end of the cutting tool can extend farther beyond the end of the housing, and then proceeds to cut a deeper countersink. Since this greater depth is incorrect, the fastening elements employed will not be flush with the panel when they are secured in place, thus necessitating the rejection of the panel.

It is an object of this invention to provide an improved cutting tool construction and operating means therefor to overcome the above and other disadvantages of the prior art.

It is another object of this invention to provide means for accurately locking a cutting element to an operating shaft to insure that the element will form a cut in an article that is precisely concentric with the axis of the shaft.

A further object of this invention is to provide a tool for cutting an opening into a material to a predetermined depth, and for supporting the tool in an operating shaft therefor against any translational movement.

A still further object of this invention is to provide a tool for forming depressions in a surface, wherein the maximum depth to which the tool can cut into the surface is selectively established and maintained, whereby to eliminate errors heretofore permitted on the basis of visual inspection.

The above and other objects and advantages of this invention will become apparent from the following description taken in conjuncttion with the accompanying drawings of illustrative embodiments thereof, in which:

FIGURE 1 is a longitudinal sectional view of a countersink cutting tool and a supporting shaft therefor, and showing the arrangement of parts for selectively determining and maintaining the maximum depth to which the cutting element can extend into a surface;

FIGURE 2 is an exploded view of the parts of the tool and holder construction of FIGURE 1;

FIGURE 3 is a sectional view taken along the line 3—3 of FIGURE 1, showing the pin arrangement for movement in a longitudinal guide channel in the threaded portion of the housing in which the shaft is supported;

FIGURE 4 is a fragmentary sectional view of the flange securing means for semi-permanently locking the parts together;

FIGURE 5 is a longitudinal sectional view, similar to FIGURE 1, showing the parts in the positions in which the cutting element has penetrated the panel to a maximum controlled depth;

FIGURE 6 is a longitudinal sectional view, similar to FIGURE 1, showing the tool-holding shaft in a retracted position for accommodating a combined drill and countersink cutting tool;

FIGURE 7 is a fragmentary longitudinal sectional view of the device of FIGURE 6, showing the parts in position wherein the drill has formed the central opening and functions therein as the pilot for the countersink device;

FIGURE 8 is an exploded view, similar to FIGURE 2, of the parts of a modification of my tool holder; and FIGURE 9 is a fragmentary sectional view taken along the line 9—9 of FIGURE 8.

Referring to FIGURE 1, there is shown an elongated housing 10 having adjacent externally threaded portions 11, 12, wherein the portion 11 is smaller in diameter than the portion 12. The housing 10 is provided with a central bore having portions 13, 14 of different diameters, with the radial shoulder transition 15 between them being located intermediate the ends of the enlarged-diameter portion 12 of the housing.

The housing 10 supports a shaft 16 for rotation therein, and means for biasing the shaft axially toward the end of the enlarged-diameter portion 12 of the housing, i.e., to the right in FIGURE 1. As shown, the shaft at its right end is provided with an enlarged-diameter portion 17 of a diameter substantially equal to the inner diameter of the enlarged-diameter portion 14 of the central bore. Surrounding the main body of the shaft 16, and abutting the inner face of the enlarged diameter portion 17 thereof, is a bearing sleeve 18. At the opposite end of the shaft, a sleeve bearing 19 is disposed between the inner wall of the housing and the shaft. This arrangement insures that the shaft is adequately supported at its opposite ends, so that it rotates without any transverse motion.

Also surrounding the shaft 16, and abutting the sleeve bearing 18, is a thrust bearing 20. A compression spring 21 surrounds the shaft and is in engagement at its ends with the sleeve bearing 19 and the thrust bearing 20. With this arrangement, the spring 21 exerts a force on the thrust bearing 20 to urge it outwardly, i.e., to the right in FIGURE 1. This force is transmitted to the enlarged portion 17 of the shaft, so that the shaft is biased to the right.

To limit axial movement of the shaft 16 to the right in housing 10, a lock ring 22 is disposed in a groove 23 in the portion of the shaft that extends beyond the reduced-diameter portion 11 of the housing. The location of the groove 23, and hence the lock ring 22, is such that the shaft is normally biased to a position wherein the lock ring 22 abuts the end of the reduced-diameter portion 11 of the housing. The radial shoulder 15 limits axial movement of the shaft 16 to the left. In this connection, in the normal position of the shaft 16, there is a space between the radial shoulder 15 and the thrust bearing 20. Thus, the shaft can be moved against the action of the spring 21 until the thrust bearing 20 engages the shoulder 15.

The end of the shaft 16 extending beyond the reduced-diameter portion 11 of the housing is adapted to releasably hold a cutting tool, illustrated as a countersink cutter element 25 having a short pilot rod member 26 extending therefrom. The cutter element 25 is supported on a shank 27 that is threaded into the shaft 16. As shown, the threaded end of the shank 27 is smaller in diameter than the main portion of the shank, thereby providing a tapered or conical portion 28.

To prevent the tool from undergoing translational movement, the end of the shaft 16 is provided with a mating taper to receive the tapered portion 28 of the shank 27, and the shaft is internally threaded inwardly of the taper. Thus, when the shank is screwed into the end of the shaft 16, the tapered portion 28 of the shank is in firm contact throughout with the surrounding wall of the shaft 16. Therefore, the shank has a large surface area in firm contact with the shaft. This arrangement serves to keep the shank from bending, whereby the cutter element 25 from cutting a countersink that is not concentric with the shaft 16.

To permit longitudinal movement of the shaft 16 in the housing 10, and to control the depth of a countersink in a panel of material, a sleeve element 30 is threadedly secured to the smaller portion 11 of the housing. The sleeve 30 surrounds the cutting element 25, the shank 27 and the adjacent end of the shaft 16. With this arrangement, the pilot 26 is inserted in the hole to be countersunk and the end of the sleeve 30, which may be flanged as shown at 31, is seated on the surface of the object to be cut.

The shaft 16 is rotated by suitable power means (not shown) as by locating a reduced-diameter extension 32 of the shaft in the chuck of a power drill. To aid in the chuck holding the shaft for rotation, the chuck-engaging portion 32 is made non-circular, as by being provided with spaced flats 32', for insertion in a mating opening in the chuck.

The position of the sleeve 30 on the housing 10 is such that the flange 31 normally extends beyond the cutter element 25. After the pilot 26 is inserted in an opening in the surface, and the flange 31 is seated against the surface, the shaft 16 is forced longitudinally toward the surface, as by an axial thrust with the power tool, to bring the cutter element 25 against the surface. Thus, rotation of the shaft while applying the axial force thereto causes cutter element 25 to cut away the material and form the desired countersink.

FIGURE 5 illustrates the parts of the unit in the positions they occupy when the countersink has been formed to the desired depth in a hole 35 in a metal panel 36. As shown, the thrust bearing 20 is in engagement with the shoulder 15 in the housing 10. The depth of the countersunk portion 37 of the hole is determined by the distance the cutter element 25 extends beyond the flange 31 of the sleeve 30.

As will readily be seen, the depth of the countersink formed by the cutter element 25 is controllable by merely adjusting the position of the sleeve 30 on the housing. By positioning the sleeve 30 so that the flange 31 is normally located nearer the end of the pilot 26, it will be seen that when the thrust bearing 20 is brought to bear against the shoulder 15, the cutter element 25 will have penetrated the panel 36 to a lesser extent. By the same token, threading the sleeve 30 onto the housing 10, so that the flange 31 is normally positioned at a greater distance from the end of the pilot 26, the cutter element 25 is permitted to extend a greater distance beyond the flange 31 by the time the thrust bearing 20 is brought to bear against the shoulder 15.

Means are provided for adjusting the sleeve 30, and for locking it in a position wherein the cutter element 25 will be assured of forming countersinks of uniform size and depth in each of a plurality of openings in the surface of an article, and for preventing alteration of the selected position of the sleeve 30. To this end, a short sleeve element 40 is slidably disposed on the threaded portion 12 of the housing 10, and a lock nut 41 is threaded onto the portion 12. The sleeve 40 is disposed between the lock nut 41 and the sleeve 30, whereby the sleeve 40 can be placed in abutment with the adjacent end of the sleeve 30, and the lock nut 41 turned to a position where it engages the adjacent end of the sleeve 40. In this manner, the sleeve 30 is locked against axial movement.

The sleeve 30 on the body 10 can be adjusted axially in discrete steps. To this end, the confronting ends of the sleeves 30 and 40 are formed with a plurality of axially extending teeth. In any desired position of the sleeve 30, the teeth 30', 40' are interdigitated. These teeth are all the same size, and the spaces between adjacent teeth on each sleeve are adapted to snugly receive a tooth of the other sleeve.

To change the position of the sleeve 30, the lock nut 41 is backed off and the sleeve 40 is moved axially out of engagement with the sleeve 30. The sleeve 30 is then turned through the desired angle, after which the sleeve 40 is moved back to interlocking engagement therewith, and the lock nut is tightened against the sleeve 40.

To aid in making such adjustment, a compression spring 43 is disposed between the end of the sleeve 40 and the transition intermediate the body portions 11, 12. The spring 43 normally urges the sleeve 40 into abutment with the sleeve 30. Accordingly, after the sleeve 40 is retracted and the sleeve 30 is turned to the desired position, release of the sleeve 40 results in the spring 43 urging the sleeve back into engagement with the sleeve 30.

To facilitate retraction of the sleeve 40, such sleeve is provided with a radial flange 44. After the lock nut 41 is backed off, one can easily retract the sleeve 40 with one hand, by placing the thumb against the end portion 32 of the shaft 16, and placing the adjacent two fingers on spaced parts of flange. By forcing the fingers and the thumb together, the flange moves with the fingers, thereby moving the sleeve 40 away from the sleeve 30.

After the sleeve 30 is located in the desired position, it is locked so as to prevent its being changed from that position. For this purpose, the flange 44 is provided with a plurality of spaced openings 45. The lock nut 41, which is of the same diameter as the flange 44, is provided with a number of more closely spaced openings 46. This arrangement insures that, whatever the position of the flange 44 when it is engaged by the lock nut 41, one of the openings 46 in the lock nut will be aligned with one of the flange openings 45.

After the lock nut 41 is brought to bear against the flange 44, a fastening element is inserted through the aligned openings 45 and 46. As shown in FIGURE 4, one form of fastening means comprises an element 47 of material which is capable of being forcibly deformed, and which remains in the deformed condition, e.g., lead. A short length of lead is located in the aligned openings 45, 46, with the ends extending past the surfaces of the flange 44 and the lock nut 41. The length of lead is placed under compression, as by the jaws 49, 50 of a pliers-like tool.

The jaws 49, 50 have concave depressions in their confronting surfaces. Thus, the ends of the length of lead are deformed to provide rounded heads that have flat surfaces abutting the flange 44 and the lock nut 41. Also, the material is forced radially into the space between the lock nut and the flange, as indicated at 50. Such shaping of the element 47 insures that the parts cannot be tampered with to change the setting of the sleeve 30.

FIGURES 6 and 7 illustrate how my tool holder accommodates a tool that both drills and countersinks a hole. As shown, the tool employs a cutter element 53 mounted on a shank 54 that is releasably secured to the shaft 16 as above described. In place of the conventional pilot, a drill bit 55 extends from the cutter element 53. Such a tool is used to successively drill and countersink a hole.

To countersink a hole like the cutter element 25 with the same tool holder, the cutter element 53 and the shank 54 are the same size as the cutter element 25 and its shank 27. To cut to the same depth requires that the cutter element 53 be able to extend from the sleeve 30 the same distance as would be required for the cutter element 25 previously described.

However, it is also necessary that the bit 55 also be retracted initially past the flange 31 of the sleeve 30. Otherwise, the sleeve 30 could not be seated against a surface until the bit had drilled sufficiently deep to permit such seating. Such a procedure would result in operation of the drill without any assurance that a hole drilled thereby was along a line normal to the surface.

To permit the same tool holder to hold the longer tool so that the point of the drill bit is normally retracted past the flange 31, the normal position of the shaft 16 is changed. For this purpose, the shaft is provided with a circumferential groove 60 that is adapted to receive the lock ring 22 (see FIGURE 1 along with FIGURES 6 and 7). The result of moving the lock ring 22 from the groove 23 to the groove 60 is that the shaft 16 is normally biased to a position farther to the right than in FIGURE 1.

The position of the groove 60 is such that when the lock ring 22 therein abuts the end of the portion 11 of the housing 10, the end of the drill bit 55 does not extend past the flange 31 of the sleeve 30. Accordingly, the flange 31 can be seated against the surface of a panel 62 in which a countersunk hole is to be formed. After positioning the flange so that the point of the bit 55 is on the desired axis of the hole, operation of the shaft as described causes the bit to drill a hole. The bit simultaneously becomes the pilot for the cutter element 53 which, upon continued operation of the shaft 16, forms the countersunk portion of the hole.

It will be recognized from the foregoing that the slotting of the sleeves 30, 40, to provide the axially extending teeth 30', 40', is the conventional arrangement for selectively adjusting the axial position of the sleeve 30. As will be apparent, the number of slots determines how small an increment of axial adjustment of the sleeve 30 can be. These slots must be formed accurately, and extreme care must be exercised to insure that no slot differs in width from any other slot, and that the width of a slot is the same as the distance between adjacent slots.

The time and effort involved in slotting the parts as shown adds considerably to the overall cost of making the tool. And despite the precautions and expense, the teeth are too easily damaged, as by dropping the parts while they are disassembled. Such damage may make it impossible to properly adjust the parts, and thereby necessitate the replacement of both sleeves 30, 40.

In my invention, these disadvantages are overcome by providing (see FIGURES 8 and 9) a threaded sleeve 70 and a slidable sleeve 71 which at their confronting ends are provided with radial flanges 72, 73. Like the flanges 41, 44 seen in FIGURE 2, the flanges 72, 73 are provided with respective sets of openings 74, 75, whereby to permit the flanges 72, 73 to be locked together, as in the manner of the flanges 41, 44.

However, the flanges 72, 73 in the device of FIGURES 8 and 9 serve as means both to position and to semipermanently lock the sleeve 70 in a desired position. In this connection, the sleeve 71 is retracted and the sleeve 70 is rotated to the desired position. The sleeve 71 is then released to cause its flange 73 to engage the flange 72. A fastening element 76, such as the lead element previously described, is than passed through aligned openings in the flanges, and crimped against the flanges. Thereafter, the operator is able to make successive cuts of precisely the same shape and depth, with assurance that the sleeve 70 will not be changed mistakenly.

The openings 74, 75 and the fastening element 76 constitute unique means for obtaining much finer adjustments of the position of the sleeve 70 than is possible in the prior art. The openings 74 in one sleeve 70 are evenly spaced, and the openings 75 in the other sleeve 71 are progressively closer together so that an opening 75 is precisely aligned with some opening 74 in substantially any position of the sleeve 70. In one example, the openings 74 and 75 were positioned so that for each .0001" change in the axial position of the sleeve 70, an opening 75 in the sleeve 71 was aligned with an opening in the sleeve 70.

Fine adjustments of this order are impossible to obtain with tools wherein the sleeves are adjusted in increments determined by the size of equally spaced teeth. My invention also represents a considerable saving in cost of manufacture. As will be apparent, the forming of teeth and notches of equal width is a painstaking procedure, in which any mistake results in rejection of the part being machined. By eliminating such expensive machining operations, my improved tool, besides providing a much finer adjustment than other such tools, is considerably less expensive to produce.

After the sleeve 70 is located in the desired position, the fastening element is passed through the openings 74, 75 that are aligned, and then crimped as above described.

In the form of my invention shown in FIGURES 8 and 9, a lock nut 78 is employed that is positioned against the adjacent end of the sleeve 71, whereby to aid in keeping the sleeve 71 in the position wherein the pin 76 extends through the flange 72.

While I have illustrated and described certain forms of my unique cutting apparatus, it will be apparent that various modifications can be made therein without departing from the spirit and scope of my invention. Accordingly, I do not intend that my invention shall be limited, except as by the appended claims.

I claim:

1. Cutting tool apparatus comprising: a housing; a cutting tool rotatably and slidably mounted in said housing; means to limit axial movement of said tool; an axially adjustable stop member on said housing adapted at one end to engage the surface of a workpiece and cooperate with said limiting means to precisely control the depth of penetration of the tool into the workpiece, said stop member including a radial flange having a plurality of spaced openings therein; and means for positioning and semi-permanently maintaining said stop member at one position on said housing, whereby to prevent the depth of cut in the workpiece by the tool from being altered, including a lock nut for engaging said flange, said lock nut having a number of openings therethrough arranged so that an opening in the lock nut is aligned with an opening in said flange when said lock nut abuts said flange; and means interconnecting said lock nut and flange through the aligned openings against relative angular movement.

2. Cutting tool apparatus comprising: a housing; a cutting tool rotatably and slidably mounted in said housing; means to limit axial movement of said tool; an axially adjustable stop member on said housing adapted to engage the surface of a workpiece, said stop member at one end extending beyond said housing and cooperating with said limiting means to precisely control the depth of penetration of the tool into the workpiece, said stop member at its opposite end having a radial flange, said flange having a plurality of spaced openings extending therethrough; a lock nut threaded on said housing; a sleeve intermediate said stop member and said lock nut, said sleeve having a radial flange at one end for releasable locking engagement with said stop member provided with at least one opening that is aligned with an opening in the other flange when said flanges are in abutment, said sleeve having a finger-grip portion at its opposite end; and means interconnecting said radial flanges through the aligned openings to prevent relative movement therebetween, whereby to prevent said stop member from being moved axially on said housing to alter the depth of cuts made in the workpiece by said tool.

3. Cutting tool apparatus comprising: a shaft having a tool retaining end, the opposite end of said shaft having a non-circular extension to be gripped for rotation by a tool chuck; a housing supporting said shaft for rotation and slidable movement; a stop member axially adjustable on said housing and having one portion normally extending beyond the tool retaining end of said shaft, said stop member having another portion including a radial flange having a plurality of spaced openings therethrough; a lock nut of the diameter of said flange adjustably threaded on said housing and adapted to lock said stop member at a predetermined position on said housing, said lock nut having openings therethrough arranged so that one of them is aligned with an opening in said flange when the lock nut abuts the flange; and means semi-permanently locking said flange and lock nut against relative axial and rotational movement, including an element of deformable material extending through the aligned openings and releasably secured to said flange and lock nut.

4. A cutting tool comprising: a housing; a rotatable shaft in said housing, said shaft being adapted for limited axial movement, said shaft having a central threaded opening in one end thereof, said opening being countersunk; a cutting tool having a shank threaded at its end to engage the threaded portion of said opening, the portion of the shank adjacent the threaded end thereof being in mating engagement with the countersunk portion of said opening, said tool having a drill bit extention; a pair of elements surrounding and axially adjustable on said housing, said elements having flanges to be placed in abutment, one of said flanges having a plurality of spaced openings therethrough, the other flange having a plurality of openings therethrough that are not equally spaced, but are arranged so that one is aligned with an opening in the other flange when such flanges are in abutment; and a fastening element extending through the aligned openings, said element having enlarged ends abutting the surfaces of the flanges around the aligned openings.

5. Cutting tool apparatus as defined in claim 4, wherein said tool includes a shank having a threaded end of reduced diameter, the transition between the shank and the threaded end thereof being frusto-conical, the lengths of said transition being of the order of the length of said threaded end, said threaded end extending into an opening in one end of said shaft, said opening being countersunk for nestably receiving said frusto-conical transition.

6. In tool apparatus for cutting into the surface of an object, the combination of: a shaft having a tool retaining end, the opposite end of said shaft having a non-circular extension to be gripped for rotation by a tool chuck; a housing supporting said shaft for rotation and sildable movement; a stop sleeve adjustably threaded on said housing and normally extending beyond the tool retaining end of said shaft, said stop sleeve having a portion including a radial flange, said flange having a plurality of spaced openings extending therethrough; a lock nut of the diameter of said flange adjustably threaded on said housing and adapted to lock said stop sleeve at a predetermined position on said housing, said lock nut having a number of openings extending therethrough that are arranged so that one of them is aligned with an opening in said flange when said lock nut is in abutment with said sleeve; and a fastener threaded through said aligned openings in said flange and lock nut, said fastener being secured to the opposed surfaces of said flange and lock nut, whereby to prevent relative axial and rotational movement between said sleeve and housing.

7. In tool apparatus for cutting into the surface of an object, the combination of: a shaft having a tool retaining end, the opposite end of said shaft having a non-circular extension to be gripped for rotation by a tool chuck; a housing supporting said shaft for rotation and slidable movement; a pair of elements surrounding and axially adjustable on said housing, said elements having flanges to be placed in abutment, one of said flanges having a plurality of space openings therethrough, the other flange having a plurality of openings therethrough that are not equally spaced, but are arranged so that one is aligned with an opening in the other flange when such flanges are in abutment; and a fastening element extending through the aligned openings, said element having enlarged ends abutting the surfaces of the flanges around the aligned openings.

References Cited in the file of this patent

UNITED STATES PATENTS

| | | |
|---|---|---|
| 1,667,218 | Purnis | Apr. 24, 1928 |
| 2,308,447 | Greenbaum | Jan. 12, 1943 |
| 2,359,859 | Jarvis | Oct. 10, 1944 |
| 2,362,260 | Foster | Nov. 7, 1944 |
| 2,710,549 | Cogsdill | June 14, 1955 |